(12) United States Patent
Da et al.

(10) Patent No.: US 11,515,977 B2
(45) Date of Patent: Nov. 29, 2022

(54) SIGNAL TRANSMISSION METHOD AND APPARATUS

(71) Applicant: DATANG MOBILE COMMUNICATIONS EQUIPMENT CO., LTD., Beijing (CN)

(72) Inventors: Ren Da, Beijing (CN); Fang-Chen Cheng, Beijing (CN); Hui Li, Beijing (CN); Qiubin Gao, Beijing (CN); Xueyuan Gao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 51 days.

(21) Appl. No.: 17/058,653

(22) PCT Filed: May 20, 2019

(86) PCT No.: PCT/CN2019/087655
§ 371 (c)(1),
(2) Date: Nov. 25, 2020

(87) PCT Pub. No.: WO2019/223659
PCT Pub. Date: Nov. 28, 2019

(65) Prior Publication Data
US 2021/0203460 A1 Jul. 1, 2021

(30) Foreign Application Priority Data
May 25, 2018 (CN) .......................... 201810516391.0

(51) Int. Cl.
*H04L 5/00* (2006.01)
*H04L 27/26* (2006.01)
*H04W 72/04* (2009.01)

(52) U.S. Cl.
CPC ........ *H04L 5/0048* (2013.01); *H04L 27/2626* (2013.01); *H04W 72/0446* (2013.01)

(58) Field of Classification Search
CPC ... H04L 5/0048; H04L 5/0078; H04L 5/0094; H04L 27/261; H04L 5/0007;
(Continued)

(56) References Cited

U.S. PATENT DOCUMENTS 9,755,797 B2 * 9/2017 Wu ........................ G01S 5/0027
10,256,957 B2 * 4/2019 Park ..................... H04W 72/005
(Continued)

FOREIGN PATENT DOCUMENTS

CN 101778068 A 7/2010
CN 105850055 A 8/2016
(Continued)

OTHER PUBLICATIONS

Huawel et al., "Discussion on RSTD measurement for FeMTC", 3GPP TSG-RAN WG4 #84 Meeting, Berlin, Germany, Aug. 21-25, 2017, total 4 pages, R4-1708290.

*Primary Examiner* — Man U Phan
(74) *Attorney, Agent, or Firm* — Kilpatrick Townsend & Stockton, LLP (57) ABSTRACT

Disclosed are a signal transmission method and apparatus for transmitting a PRS signal in a 5G NR system, enabling a PRS to be applied to terminal positioning in a 5G NR system. Provided are a signal transmission method, comprising: determining positioning reference signal (PRS) configuration information preset for a cell; and sending a PRS signal to a terminal according to the PRS configuration information.

19 Claims, 4 Drawing Sheets

---

Determining the PRS configuration information preset for a cell — S201

Receiving a PRS signal based on the PRS configuration information — S202

(58) Field of Classification Search
CPC .... H04L 27/2626; H04L 5/00; H04W 64/006; H04W 72/0446; H04W 72/04; H04W 27/26; G01S 5/0236; G01S 2205/008
USPC ......................................................... 370/336
See application file for complete search history.

(56) References Cited

U.S. PATENT DOCUMENTS

| | | | |
|---|---|---|---|
| 10,383,080 B2* | 8/2019 | Han | G01S 3/48 |
| 10,439,775 B2* | 10/2019 | Mirbagheri | H04W 72/02 |
| 10,547,421 B2* | 1/2020 | Palanivelu | H04L 5/0005 |
| 10,944,659 B2* | 3/2021 | Manolakos | H04L 27/261 |
| 2016/0065342 A1 | 3/2016 | Mirbagheri et al. | |
| 2017/0142682 A1* | 5/2017 | Gunnarsson | G01S 1/20 |
| 2017/0374638 A1 | 12/2017 | Han et al. | |
| 2018/0054286 A1* | 2/2018 | Tang | H04L 27/26 |
| 2018/0097596 A1 | 4/2018 | Palanivelu et al. | |
| 2018/0124787 A1* | 5/2018 | Wang | H04W 64/00 |
| 2020/0344712 A1* | 10/2020 | Akkarakaran | H04L 25/0224 |
| 2021/0176022 A1* | 6/2021 | Qi | H04L 5/02 |
| 2021/0297215 A1* | 9/2021 | Da | H04L 5/0048 |
| 2021/0345130 A1* | 11/2021 | Bi | H04L 27/2613 |

FOREIGN PATENT DOCUMENTS

| | | | |
|---|---|---|---|
| CN | 107431678 A | 12/2017 | |
| CN | 107852582 A | 3/2018 | |

* cited by examiner

SIGNAL TRANSMISSION METHOD AND APPARATUS

The present application is a national phase entry under 35 U.S.C. § 371 of International Application No. PCT/CN2019/087655, filed on May 20, 2019, which claims the priority from Chinese Patent Application No. 201810516391.0, filed with the China National Intellectual Property Administration on May 25, 2018 and entitled "Signal Transmission Method and Apparatus", which is hereby incorporated by reference in its entirety.

FIELD

The present application relates to the field of communication technologies, and particularly to a signal transmission method and apparatus.

BACKGROUND

The Observed Time Difference of Arrival (OTDOA) is a method introduced in the 3GPP to use the measured downlink reference signal time difference for positioning. In this method, a User Equipment (UE) measures the reference signals sent by a serving cell and a neighbor cell to obtain the Reference Signal Time Difference Measurement (RSTD), and reports the RSTD measurement to a network positioning server. The network positioning server then uses the multipoint positioning algorithm or other algorithms to determine the position of the UE.

In order to provide the fine OTDOA positioning performance, the 3GPP specifically defines the Positioning Reference Signal (PRS) for supporting the OTDOA to help the UE to detect the downlink reference signals from a sufficient number of neighbor cells.

However, multi-beam PRS transmission is not supported in the conventional LTE (Long Time Evolution) system, while the support for multi-beam transmission and its corresponding beam management is an important feature in the 5G New Radio (5G NR) system. As such, the PRS cannot be applied to the terminal positioning in the 5G NR system.

SUMMARY

The embodiments of the present application provide a signal transmission method and apparatus, to realize the transmission of the PRS signal in the 5G NR system and further realize the application of the PRS to the terminal positioning in the 5G NR system.

At the network side, a signal transmission method provided by some embodiments of the present application includes:

determining Positioning Reference Signal (PRS) configuration information preset for a cell;

sending a PRS signal to a terminal based on the PRS configuration information.

With this method, the PRS signal is sent to the terminal based on the PRS configuration information preset for the cell, so that the transmission of the PRS signal in the 5G NR system can be realized, and thus the PRS can be applied to the terminal positioning in the 5G NR system.

In one embodiment, the PRS configuration information includes parameter information of PRS block sets;

where each PRS block set contains one or more PRS blocks, and each PRS block contains one or more consecutive Orthogonal Frequency Division Multiplexing (OFDM) symbols occupied by the PRS signal.

In one embodiment, the parameter information of PRS block sets includes: time-domain configuration information and frequency-domain configuration information for transmitting PRS block sets.

In one embodiment, the time-domain configuration information for transmitting PRS block sets includes:

a period and a slot offset of a PRS block set;

PRS block identifiers or a quantity of PRS blocks in the PRS block set;

positions and a quantity of OFDM symbols occupied by the PRS in each PRS block, or positions and a quantity of slots occupied for transmitting the PRS block;

a quantity of slots between every two adjacent PRS blocks, or a quantity of OFDM symbols between every two adjacent PRS blocks.

In one embodiment, the frequency-domain configuration information for transmitting PRS block sets includes:

a PRS bandwidth, frequency-domain position information, and mapping information of a PRS Resource Element (RE) in a Resource Block (RB).

In one embodiment, the resource mapping of the PRS in each PRS block set includes one of the following:

in a first way: each PRS block set contains a quantity $N_{block}$ of PRS blocks, each PRS block contains a quantity $N_{symbol}$ of OFDM symbols occupied by the PRS, each PRS block set contains a total quantity of $N_{set}=N_{block}*N_{symbol}$ of PRS OFDM symbols, the $N_{set}$ OFDM symbols occupied by the PRS are sequentially mapped to slots for PRS occupied by the PRS block set in order of valid downlink OFDM symbols, and invalid OFDM symbols and Time Division Duplexing (TDD) uplink OFDM symbols are avoided;

in a second way: each PRS block set contains a quantity $N_{block}$ of PRS blocks, each PRS block contains a quantity $N_{slot}$ of slots for PRS, there are a quantity $N_{gap}$ of slots between every two adjacent PRS blocks, $N_{gap} \geq 0$, and OFDM symbols occupied by the PRS occupy all valid downlink OFDM symbols and avoid invalid OFDM symbols and TDD uplink OFDM symbols in each slot for PRS.

In one embodiment, the method further includes:

receiving positioning measurements fed back by the terminal, the positioning measurements being obtained by the terminal by measuring the PRS signal, and positioning the terminal based on the positioning measurement.

Therefore, the network side can position the terminal based on the positioning measurements measured and fed back by the terminal using the PRS signal.

Correspondingly, at the terminal side, a signal transmission method provided by some embodiments of the present application includes:

determining the PRS configuration information preset for a cell;

receiving a PRS signal based on the PRS configuration information.

In one embodiment, the PRS configuration information includes parameter information of PRS block sets;

where each PRS block set contains one or more PRS blocks, and each PRS block contains one or more consecutive OFDM symbols occupied by the PRS signal.

In one embodiment, the parameter information of PRS block sets includes: time-domain configuration information and frequency-domain configuration information for transmitting PRS block sets.

In one embodiment, the time-domain configuration information for transmitting PRS block sets includes:

a period and a slot offset of a PRS block set;

PRS block identifiers or a quantity of PRS blocks in the PRS block set;

positions and a quantity of OFDM symbols occupied by a PRS in each PRS block, or positions and a quantity of slots occupied for transmitting the PRS block;

a quantity of slots between every two adjacent PRS blocks, or a quantity of OFDM symbols between every two adjacent PRS blocks.

In one embodiment, the frequency-domain configuration information for transmitting PRS block sets includes:

a PRS bandwidth, frequency-domain position information, and mapping information of a PRS RE in an RB.

In one embodiment, the resource mapping is performed on a PRS in each PRS block set in one of the following ways:

in a first way: each PRS block set contains a quantity $N_{block}$ of PRS blocks, each PRS block contains a quantity $N_{symbol}$ of OFDM symbols occupied by the PRS signal, each PRS block set contains a total quantity of $N_{set}=N_{block}*N_{symbol}$ of PRS OFDM symbols, the quantity $N_{set}$ of OFDM symbols occupied by the PRS signal are sequentially mapped to slots for PRS occupied by the PRS block set in order of valid downlink OFDM symbols, and invalid OFDM symbols and TDD uplink OFDM symbols are avoided;

in a second way: each PRS block set contains a quantity $N_{block}$ of PRS blocks, each PRS block contains a quantity $N_{slot}$ of slots for PRS, there are a quantity $N_{gap}$ of slots between every two adjacent PRS blocks, $N_{gap} \geq 0$, and OFDM symbols occupied by PRS occupy all valid downlink OFDM symbols and avoid invalid OFDM symbols and TDD uplink OFDM symbols in each slot for PRS.

In one embodiment, the method further includes:

for any cell, detecting each PRS block in a PRS block set transmitted in the cell;

determining a detectable PRS block in the PRS block set; and determining positioning measurements by measuring the PRS signal in the detectable PRS block; and feeding back the positioning measurements to a network side.

In one embodiment, the method further includes:

feeding back index information of the PRS block corresponding to the positioning measurements in the PRS block set.

In one embodiment, the method further includes:

feeding back measurement time corresponding to the positioning measurements.

At the network side, a signal transmission device provided by some embodiments of the present application includes:

a memory configured to store program instructions;

a processor configured to invoke the program instructions stored in the memory, and in accordance with the obtained program, perform the process of:

determining the PRS configuration information preset for a cell;

sending a PRS signal to a terminal based on the PRS configuration information.

In one embodiment, the PRS configuration information includes parameter information of PRS block sets;

where each PRS block set contains one or more PRS blocks, and each PRS block contains one or more consecutive OFDM symbols occupied by the PRS signal.

In one embodiment, the parameter information of PRS block sets includes: time-domain configuration information and frequency-domain configuration information for transmitting PRS block sets.

In one embodiment, the time-domain configuration information for transmitting PRS block sets includes:

a period and a slot offset of a PRS block set;

PRS block identifiers or a quantity of PRS blocks in the PRS block set;

positions and a quantity of OFDM symbols occupied by a PRS in each PRS block, or positions and a quantity of slots occupied for transmitting the PRS block;

a quantity of slots between every two adjacent PRS blocks, or a quantity of OFDM symbols between every two adjacent PRS blocks.

In one embodiment, the frequency-domain configuration information of transmitting PRS block set includes:

a PRS bandwidth, frequency-domain position information, and mapping information of a PRS RE in an RB.

In one embodiment, the resource mapping of the PRS signal in each PRS block set includes one of the following:

in a first way: each PRS block set contains a quantity $N_{block}$ of PRS blocks, each PRS block contains a quantity $N_{symbol}$ of OFDM symbols occupied by the PRS signal, each PRS block set contains a total quantity of $N_{set}=N_{block}*N_{symbol}$ of PRS OFDM symbols, the quantity $N_{set}$ of OFDM symbols occupied by PRS signal are sequentially mapped to slots for PRS occupied by the PRS block set in order of valid downlink OFDM symbols, and invalid OFDM symbols and TDD uplink OFDM symbols are avoided;

in a second way: each PRS block set contains a quantity $N_{block}$ of PRS blocks, each PRS block contains a quantity $N_{slot}$ of slots for PRS, there are a quantity $N_{gap}$ of slots between every two adjacent PRS blocks, $N_{gap} \geq 0$, and OFDM symbols occupied by the PRS signal include all valid downlink OFDM symbols and avoid invalid OFDM symbols and TDD uplink OFDM symbols in each slot for PRS.

In one embodiment, the processor is further configured to:

receive positioning measurements fed back by the terminal, the positioning measurements being obtained by the terminal by measuring the PRS signal, and position the terminal based on the positioning measurements.

At the terminal side, a signal transmission device provided by some embodiments of the present application includes:

a memory configured to store program instructions;

a processor configured to invoke the program instructions stored in the memory, and in accordance with the obtained program, perform the process of:

determining the PRS configuration information preset for a cell;

receiving a PRS signal based on the PRS configuration information.

In one embodiment, the PRS configuration information includes parameter information of PRS block sets;

where each PRS block set includes one or more PRS blocks, and each PRS block includes one or more consecutive OFDM symbols occupied by the PRS signal.

In one embodiment, the parameter information of PRS block sets includes: time-domain configuration information and frequency-domain configuration information for transmitting PRS block set.

In one embodiment, the time-domain configuration information for transmitting PRS block sets includes:

a period and a slot offset of a PRS block set;

PRS block identifiers or a quantity of PRS blocks in a PRS block set;

positions and a quantity of OFDM symbols occupied by a PRS in each PRS block, or positions and a quantity of slots occupied for transmitting the PRS block;

a quantity of slots between every two adjacent PRS blocks, or a quantity of OFDM symbols between every two adjacent PRS blocks.

In one embodiment, the frequency-domain configuration information of transmitting PRS block set includes:

a PRS bandwidth, frequency-domain position information, and mapping information of a PRS RE in an RB.

In one embodiment, the resource mapping is performed on a PRS in each PRS block set in one of the following ways:

in a first way: each PRS block set contains a quantity $N_{block}$ of PRS blocks, each PRS block contains a quantity $N_{symbol}$ of OFDM symbols occupied by the PRS signal, each PRS block set contains a total quantity of $N_{set}=N_{block}*N_{symbol}$ of PRS OFDM symbols, the quantity $N_{set}$ of OFDM symbols occupied by the PRS signal are sequentially mapped to slots for PRS occupied by the PRS block set in order of valid downlink OFDM symbols, and invalid OFDM symbols and TDD uplink OFDM symbols are avoided;

in a second way: each PRS block set contains a quantity $N_{block}$ of PRS blocks, each PRS block contains a quantity $N_{slot}$ of slots for PRS, there are a quantity $N_{gap}$ of slots between every two adjacent PRS blocks, $N_{gap} \geq 0$, and OFDM symbols occupied by the PRS signal include all valid downlink OFDM symbols and avoid invalid OFDM symbols and TDD uplink OFDM symbols in each slot for PRS.

In one embodiment, the processor is further configured to:

for any cell, detect each PRS block in a PRS block set transmitted in the cell; determine a detectable PRS block in the PRS block set, and determine positioning measurements by measuring a PRS signal in the detectable PRS block, and feedback the positioning measurements to a network side.

In one embodiment, the processor is further configured to:

feedback index information of the PRS block corresponding to the positioning measurements in the PRS block set.

In one embodiment, the processor is further configured to:

feedback measurement time corresponding to the positioning measurements.

At the network side, another signal transmission device provided by some embodiments of the present application includes:

a determining device configured to determine the PRS configuration information preset for a cell;

a sending device configured to send a PRS signal to a terminal based on the PRS configuration information.

At the terminal side, another signal transmission device provided by some embodiments of the present application includes:

a determining device configured to determine the PRS configuration information preset for a cell;

a receiving device configured to receive a PRS signal based on the PRS configuration information.

Another embodiment of the present application provides a computing device, which includes a memory and a processor. The memory is configured to store the program instructions, and the processor is configured to invoke the program instructions stored in the memory and perform any one of the above-mentioned methods in accordance with the obtained program.

Another embodiment of the present application provides a computer storage medium storing the computer executable instructions which are configured to cause the computer to perform any one of the above-mentioned methods.

BRIEF DESCRIPTION OF THE DRAWINGS

In order to illustrate the embodiments of the present application more clearly, the accompanying figures which need to be used in describing the embodiments will be introduced below briefly.

DETAILED DESCRIPTION OF THE EMBODIMENTS

The embodiments of the present application provide a signal transmission method and apparatus, to realize the transmission of the PRS signal in the 5G NR system and further realize the application of the PRS to the terminal positioning in the 5G NR system.

In the Positioning Reference Signal (PRS) design, the PRS signal of each cell is transmitted in a configured transmission mode and with a configured power. The transmission mode is defined by the transmission period, transmission duration and transmission offset. In the transmission duration, the PRS signal is transmitted by PRS resource elements in PRS Orthogonal Frequency Division Multiplexing (OFDM) symbols within a defined subframe. Generally, in order to reduce the interference from other data or reference signals to the greatest extent, other data or reference signals are not transmitted during the PRS transmission duration. And, the sending power of each PRS Resource Element (RE) (i.e., Energy Per Resource Element (EPRE)) in the same cell is the same.

In the PRS design, the PRS signal from a cell is transmitted periodically in the pre-configured pattern. The sending power of each PRS RE (EPRE) is the same, and the PRS EPRE generally cannot be less than the EPRE of other broadcast data or reference signal, since a User Equipment (UE) needs to detect PRSs from at least three cells to achieve the purpose of determining the position of the UE. However, the PRS signal needs to occupy a large amount of system resources, otherwise it is difficult to ensure the performance and accuracy of the positioning system, especially for the positioning in the indoor environment.

The conventional LTE system does not support the multi-beam PRS transmission. Since the support for beam forming and beam scanning is an important feature in the 5G NR system, the positioning reference signal design of the 5G NR system also needs to support the beam forming and beam scanning. The embodiments of the present application propose a transmission method of the positioning reference signal used for the NR system and supporting multiple beams, so that the PRS can be used to implement the terminal positioning in the NR system.

The embodiments of the present application proposes a PRS transmission scheme in the NR system, which implements the PRS mapping and transmission by presetting the PRS configuration information for a cell and/or a neighboring cell through the network.

Here, the PRS configuration information, for example, may include the parameter information of PRS block sets. Each PRS block set contains one or more PRS blocks, and each PRS block contains one or more consecutive OFDM symbols occupied by the PRS signal.

Of course, the PRS configuration information may also include other configuration information, which is to realize the PRS transmission between the terminal and the network side in the NR system. Therefore, the information that contributes to the PRS transmission may be used as the PRS configuration information.

At the Network Side

The network side configures the parameter information of PRS block sets for each cell, and sends the parameter information of PRS block sets of each cell or multiple adjacent cells to the terminal.

Each cell transmits the PRS signal according to the configured PRS block set parameter. The configuration of parameter information of PRS block sets includes: the time-domain information and frequency-domain information for transmitting PRS block set.

Here, the time-domain information of transmitting PRS block set includes:

the period and the slot offset of a PRS block set;

which PRS blocks are transmitted in a PRS block set, or PRS block identifiers or the quantity of PRS blocks in a PRS block set;

positions and the quantity of OFDM symbols occupied by a PRS in each PRS block, or positions and the quantity of slots occupied for transmitting the PRS block;

the quantity of slots between every two adjacent PRS blocks, or the quantity of OFDM symbols between every two adjacent PRS blocks.

The frequency-domain information of transmitting PRS block set includes: the PRS bandwidth, the frequency-domain position information, and the mapping information of PRS REs in the RB.

The network side receives the positioning measurements fed back by the terminal, the positioning measurements being obtained by the terminal by measuring the PRS signal, and determines the position of the terminal based on the positioning measurements.

At the Terminal Side

The terminal side receives the parameter information of PRS block sets of at least one cell and/or neighboring cells sent by the network side.

For any cell, the terminal will try to detect each PRS block in the PRS block set transmitted in this cell. Each PRS block uses different beam-forming weights, that is, the beam scanning is performed among different PRS blocks. Here, in one embodiment, the terminal may determine the detectable PRS block in a PRS block set according to the average Reference Signal Received Power (RSRP) of each PRS block.

For the PRS signal in the detectable PRS block, the terminal measures the PRS signal and feeds back the positioning measurements obtained based on the detectable PRS block to the network side. Since this detectable PRS block is determined by beam scanning, this positioning measurements are the best positioning measurements. Here the positioning measurements include, for example, the Reference Signal Time Difference (RSTD), and the received power RSRP of the reference signal, etc.

In one embodiment, the terminal may also feedback the block index information of the PRS block, corresponding to the positioning measurements, in the PRS block set.

In one embodiment, the terminal will also feedback the measurement time corresponding to the positioning measurements.

The PRS block and the PRS block set described in the embodiments of the present application will be specifically introduced below.

PRS Block (PRSB): one PRS block contains a PRS signal occupying one or more consecutive Orthogonal Frequency Division Multiplexing (OFDM) symbols. The PRS signal in each PRS block is sent by using the same beam. The quantity of OFDM symbols occupied by the PRS in one PRS block can be configured. One or more PRS blocks can be configured in one slot. In addition, one PRS block can also occupy more than one slot.

PRS Block Set (PRSBS): one PRS block set contains one or more PRS blocks. The maximum quantity of PRS blocks in one PRS block set and the relative time-domain position of each PRS block in the PRS block set can be predefined by the protocol. For example, the maximum quantity of PRS blocks contained in the PRS block set is not less than the maximum quantity of SSB blocks in the Synchronization Signal Block (SSB) block set defined in the 3GPP specification.

In other words, for the carrier frequency range less than 3 GHz, the maximum quantity of PRS blocks contained in one PRS block set is not less than 4. For the carrier frequency range between 3 GHz and 6 GHz, the maximum quantity of PRS blocks contained in one PRS block set is not less than 8. For the carrier frequency range greater than 6 GHz, the quantity of PRS blocks contained in the PRS block set is not less than 64.

In a specific implementation, the network side can configure which PRS blocks in the PRS block set are used to send PRS signals as needed. For example, in an implementation, the quantity of PRS blocks in the configured PRS block set may be the same as the quantity of Synchronization Signal (SS)/Physical Broadcast Channel (PBCH) blocks in the configured SS/PBCH block set; and the beam direction of the PRS blocks in the configured PRS block set may correspond to the beam direction of the SS/PBCH blocks in the configured SS/PBCH block set. In another implementation, when the PRS beam width is different from the SS/PBCH beam width, the quantity of PRS blocks in the PRS block set may be less than or greater than the number of SS/PBCH blocks in the SS/PBCH block set. The beam direction of the PRS blocks may also be different from the beam direction of the SS/PBCH blocks.

Figure 1:
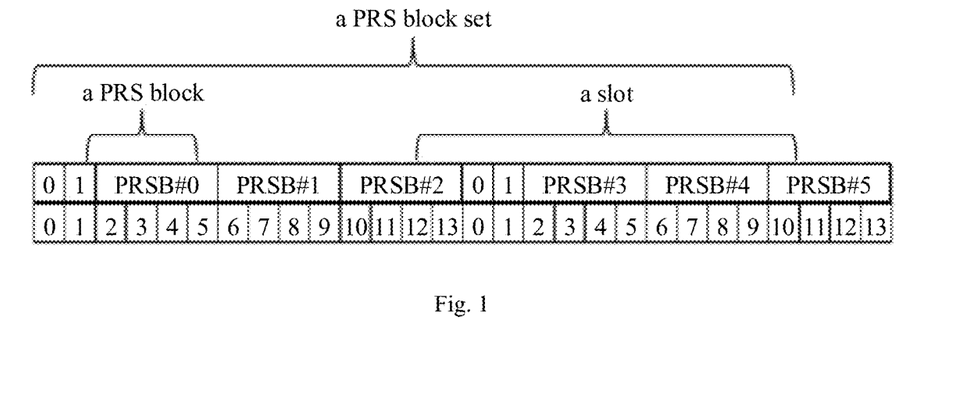
FIG. 1 is a schematic diagram of the NR PRS block and PRS block set provided by some embodiments of the present application.

FIG. 1 gives a possible PRS block set configuration example. Each PRS block contains 4 consecutive OFDM symbols occupied by the PRS, all of which perform the PRS transmission in the same beam direction. Each PRS block set contains 6 PRS blocks in total, which are transmitted in 6 different beam directions respectively. The PRS blocks PRSB #0, PRSB #1 and PRSB #2 are configured in consecutive OFDM symbols, and there is no symbol gap between them. However, there is a gap of two OFDM symbols for downlink control channel transmission between PRSB #2 and PRSB #3.

Figure 2:
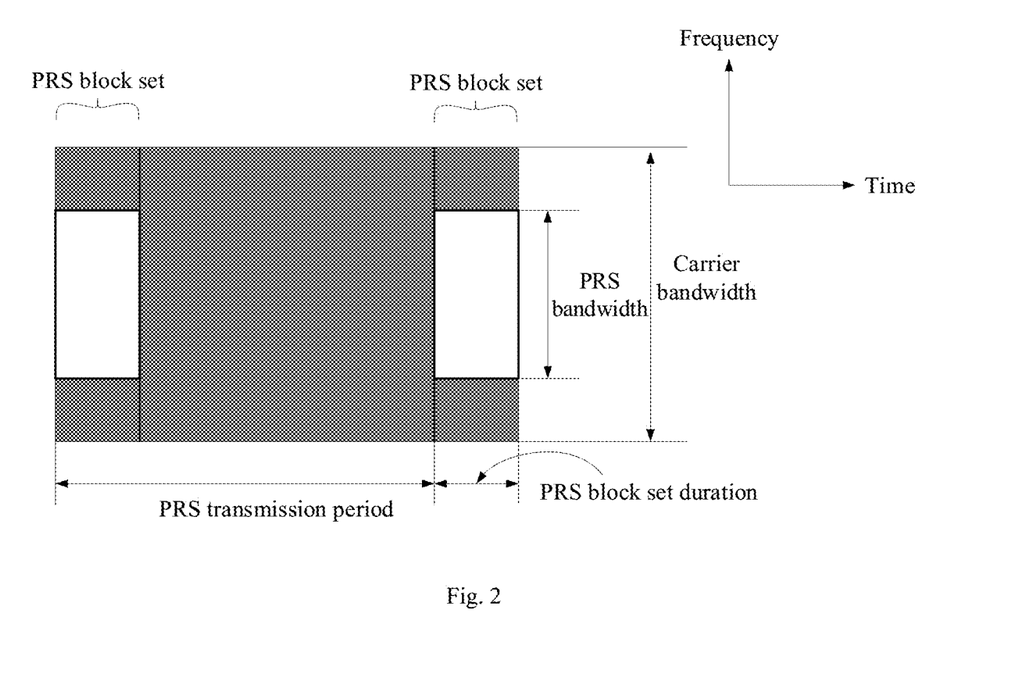
FIG. 2 is a schematic diagram of a mapping pattern of the NR PRS block set provided by some embodiments of the present application.

The mapping pattern of the PRS block set is as shown in FIG. 2. The network side configures the transmission period and frequency position for the PRS block set, and maps and transmits the PRS block set based on this configuration.

The frequency-domain configuration of the PRS resource indicates the mapping of the PRS RE to the PRS RB, and indicates the frequency-domain position information and bandwidth of the PRS RB.

The time-domain configuration of PRS resources is introduced as follows.

Table 1 below gives the time-domain configuration of the transmission period $T_{PRS}$ and the slot offset $\Delta_{PRS}$ of a PRS block set, where the period and slot offset may be obtained based on the configuration parameter $I_{PRS}$. One PRS block set can occupy one or more slots. The first slot occupied by the first PRS block in one PRS block set in a radio frame should satisfy $(10 \cdot n_f + n_{sf} - \Delta_{PRS}) \bmod T_{PRS} = 0$, and $n_f$ represents the system frame number, and $n_{sf}$ represents the slot number in a radio frame.

TABLE 1

Time-domain configuration of PRS block set

| PRS configuration Index $I_{PRS}$ | PRS periodicity $T_{PRS}$ (slots) | PRS offset $\Delta_{PRS}$ (slots) |
| --- | --- | --- |
| 0-4 | 5 | $I_{PRS}$ |
| 5-14 | 10 | $I_{PRS}$-5 |
| 25-34 | 20 | $I_{PRS}$-25 |
| 35-74 | 40 | $I_{PRS}$-35 |
| 75-154 | 80 | $I_{PRS}$-75 |
| 155-314 | 160 | $I_{PRS}$-155 |
| 315-634 | 320 | $I_{PRS}$-315 |
| 635-1274 | 640 | $I_{PRS}$-635 |
| 1275-2554 | 1280 | $I_{PRS}$-1275 |
| 2555-4095 |  | Reserved |

Each PRS block set includes one or more PRS blocks. Each PRS block contains one or more OFDM symbols. In one NR PRS block set, the PRS mapping can be performed in two schemes as follows.

First Scheme

It is assumed that one PRS block set contains a quantity $N_{block}$ of PRS blocks, and each PRS block contains a quantity $N_{symbol}$ of OFDM symbols occupied by PRS (referred to as PRS OFDM symbols for short). Such a PRS block set contains a quantity $N_{set} = N_{block} * N_{symbol}$ of PRS OFDM symbols in total. The quantity $N_{set}$ of OFDM symbols occupied by PRS are sequentially mapped to the slots containing PRS (referred to as slots for PRS for short) occupied by the PRS block set in order of valid downlink OFDM symbols, and the invalid OFDM symbols and Time Division Duplexing (TDD) uplink OFDM symbols are avoided.

Here, the valid downlink OFDM symbols are downlink OFDM symbols configured by the network side and do not fall into the measurement gaps configured by the network side.

The invalid OFDM symbols are one or more combinations of the following:

the first $N_{PDCCH}$ downlink OFDM symbols reserved for downlink control channel PDCCH transmission in one slot, where $N_{PDCCH}$ is fixed or configurable;

the downlink OFDM symbols occupied by the SS/PBCH blocks.

FIG. 1 illustrates an example. It is assumed that a PRS block set contains 6 PRS blocks and each PRS block contains 4 OFDM symbols occupied by the PRS. The first two OFDM symbols in one slot for PRS are used for the downlink control channel.

Second Scheme

It is assumed that one PRS block set contains a quantity $N_{block}$ of PRS blocks and each PRS block contains a quantity $N_{slot}$ of slots for PRS. There may be a quantity $N_{gap}$ ($N_{gap} \geq 0$) of slot gaps between PRS blocks. In each slot for PRS, the OFDM symbols occupied by the PRS include all valid downlink OFDM symbols, and avoid the invalid OFDM symbols and TDD uplink OFDM symbols. Where the invalid OFDM symbols are one or more combinations of the following:

the first $N_{PDCCH}$ downlink OFDM symbols reserved for PDCCH transmission in one slot, where $N_{PDCCH}$ is fixed or configurable;

the downlink OFDM symbols occupied by the SS/PBCH blocks.

Figure 3:
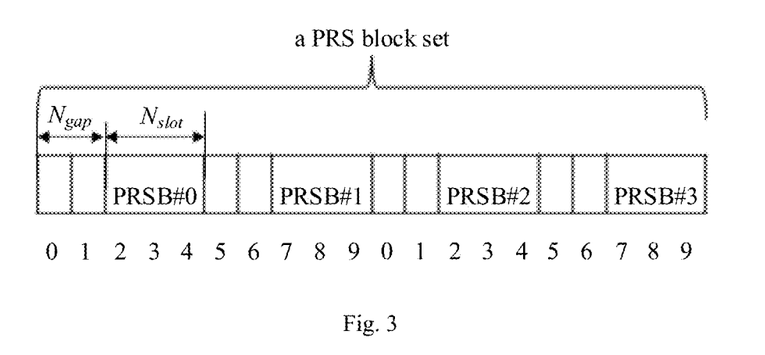
FIG. 3 is a schematic diagram of PRS mapping in the NR PRS block set provided by some embodiments of the present application.

FIG. 3 illustrates an example. It is assumed that a PRS block set contains 4 PRS blocks, each PRS block contains 3 slots for PRS, and there is a gap of 2 slots between PRS blocks, where this gap is used for data service transmission in the PRS block set.

Definitions of parameter value ranges:

$I_{PRS}$: PRS configuration index, of which the range may be $\{0, \ldots, 2554\}$; $N_{block}$: the quantity of PRS blocks in a PRS block set, of which the range may be $\{1, \ldots, 64\}$;

$N_{symbol}$: the quantity of PRS symbols in a PRS block in the first scheme, of which the range may be $\{1, 2, \ldots, 140\}$;

$N_{slot}$: the quantity of slots for PRS occupied by a PRS block in the second scheme, of which the range may be $\{1, \ldots, 10\}$;

$N_{PDCCH}$: the first $N_{PDCCH}$ OFDM symbols in a slot are reserved for PDCCH transmission, of which the range may be $\{1, \ldots, 3\}$.

Figure 4:
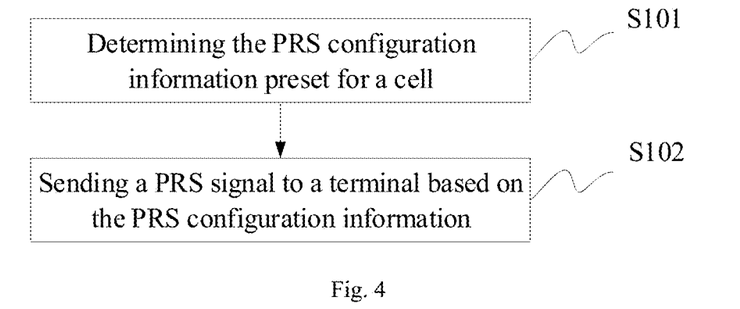
FIG. 4 is a flow schematic diagram of a signal transmission method at the network side provided by some embodiments of the present application.

In view of the above, referring to FIG. 4, at the network side, a signal transmission method provided by some embodiments of the present application includes:

S101: determining the PRS configuration information preset for a cell;

S102: sending a PRS signal to a terminal based on the PRS configuration information.

With this method, the PRS signal is sent to the terminal based on the PRS configuration information preset for the cell, so that the transmission of the PRS signal in the LTE system can be realized, and thus the PRS can be applied to the terminal positioning in the 5G NR system.

In one embodiment, the PRS configuration information includes the parameter information of PRS block sets;

and each PRS block set contains one or more PRS blocks, and each PRS block contains one or more consecutive OFDM symbols occupied by the PRS signal.

In one embodiment, the parameter information of PRS block sets includes: the time-domain configuration information and frequency-domain configuration information of transmitting PRS block set.

In one embodiment, the time-domain configuration information for transmitting PRS block set includes:

the period and the slot offset of a PRS block set;

PRS block identifiers or the quantity of PRS blocks in a PRS block set;

positions and quantity of OFDM symbols occupied by a PRS in each PRS block, or positions and quantity of slots occupied for transmitting the PRS block;

the quantity of slots between every two adjacent PRS blocks, or the quantity of OFDM symbols between every two adjacent PRS blocks.

In one embodiment, the frequency-domain configuration information for transmitting PRS block set includes:

the PRS bandwidth, the frequency-domain position information, and the mapping information of a PRS RE in an RB.

In one embodiment, the resource mapping of a PRS in each PRS block set includes one of the following:

in a first way: each PRS block set contains a quantity $N_{block}$ of PRS blocks, each PRS block contains a quantity $N_{symbol}$ of OFDM symbols occupied by PRS, each PRS block set contains a total quantity of $N_{set}=N_{block}*N_{symbol}$ of PRS OFDM symbols, the quantity $N_{set}$ of OFDM symbols occupied by PRS are sequentially mapped to slots for PRS occupied by the PRS block set in order of valid downlink OFDM symbols, and invalid OFDM symbols and TDD uplink OFDM symbols are avoided;

in a second way: each PRS block set contains a quantity $N_{block}$ of PRS blocks, each PRS block contains a quantity $N_{slot}$ of slots for PRS, there are a quantity $N_{gap}$ of slots between every two adjacent PRS blocks, $N_{gap} \geq 0$, and OFDM symbols occupied by PRS include all valid downlink OFDM symbols and avoid invalid OFDM symbols and TDD uplink OFDM symbols in each slot for PRS.

In one embodiment, the method further includes:

receiving positioning measurements fed back by the terminal, the positioning measurements being obtained by the terminal by measuring the PRS signal, and positioning the terminal based on the positioning measurements.

Therefore, the network side can position the terminal based on the positioning measurements measured and fed back by the terminal using the PRS signal.

Figure 5:
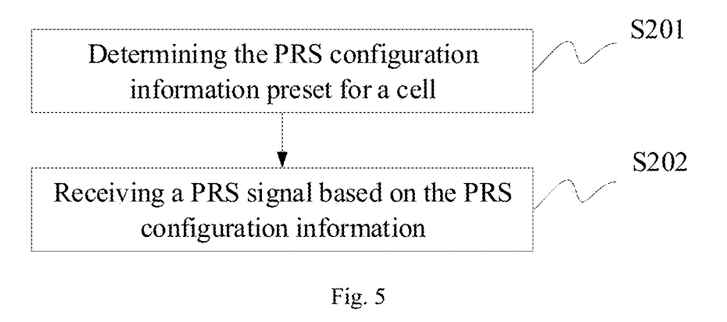
FIG. 5 is a flow schematic diagram of a signal transmission method at the terminal side provided by some embodiments of the present application.

Correspondingly, referring to FIG. 5, at the terminal side, a signal transmission method provided by some embodiments of the present application includes:

S201: determining the PRS configuration information preset for a cell;

S202: receiving a PRS signal based on the PRS configuration information.

In one embodiment, the PRS configuration information includes the parameter information of PRS block sets;

where each PRS block set contains one or more PRS blocks, and each PRS block contains one or more consecutive OFDM symbols occupied by the PRS signal.

In one embodiment, the parameter information of PRS block sets includes: the time-domain configuration information and frequency-domain configuration information of transmitting PRS block set.

In one embodiment, the time-domain configuration information for transmitting PRS block sets includes:

the period and the slot offset of a PRS block set;

PRS block identifiers or quantity of PRS blocks in a PRS block set;

positions and quantity of OFDM symbols occupied by a PRS in each PRS block, or positions and quantity of slots occupied for transmitting the PRS block;

the quantity of slots between every two adjacent PRS blocks, or the quantity of OFDM symbols between every two adjacent PRS blocks.

In one embodiment, the frequency-domain configuration information of transmitting PRS block set includes:

the PRS bandwidth, the frequency-domain position information, and the mapping information of a PRS RE in an RB.

In one embodiment, the resource mapping of a PRS in each PRS block set includes one of the following:

in a first way: each PRS block set contains a quantity $N_{block}$ of PRS blocks, each PRS block contains a quantity $N_{symbol}$ of OFDM symbols occupied by PRS, each PRS block set contains a total quantity of $N_{set}=N_{block}*N_{symbol}$ of PRS OFDM symbols, the quantity $N_{set}$ of OFDM symbols occupied by PRS are sequentially mapped to slots for PRS occupied by the PRS block set in order of valid downlink OFDM symbols, and invalid OFDM symbols and TDD uplink OFDM symbols are avoided;

in a second way: each PRS block set contains a quantity $N_{block}$ of PRS blocks, each PRS block contains a quantity $N_{slot}$ of slots for PRS, there are a quantity $N_{gap}$ of slots between every two adjacent PRS blocks, $N_{gap} \geq 0$, and OFDM symbols occupied by PRS include all valid downlink OFDM symbols and avoid invalid OFDM symbols and TDD uplink OFDM symbols in each slot for PRS.

In one embodiment, the method further includes:

for any cell, detecting each PRS block in a PRS block set transmitted in the cell; determining a detectable PRS block in the PRS block set, determining positioning measurements by measuring a PRS signal in the detectable PRS block, and feeding back the positioning measurements to the network side.

In one embodiment, the method further includes:

feeding back the index information of the PRS block corresponding to the positioning measurements in the PRS block set.

In one embodiment, the method further includes:

feeding back the measurement time corresponding to the positioning measurements.

Figure 6:
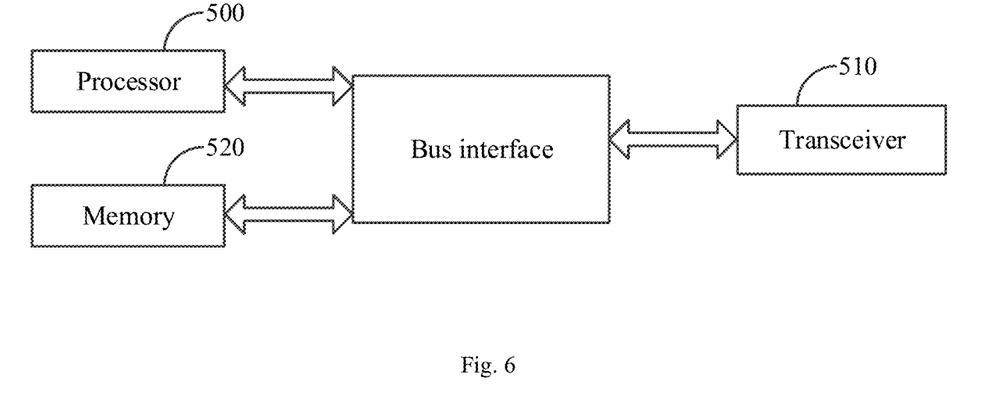
FIG. 6 is a structural schematic diagram of a signal transmission apparatus at the network side provided by some embodiments of the present application.

Referring to FIG. 6, at the network side, a signal transmission apparatus provided by some embodiments of the present application includes:

a memory 520 configured to store program instructions;

a processor 500 configured to invoke the program instructions stored in the memory, and in accordance with the obtained program, perform the process of:

determining the PRS configuration information preset for a cell;

sending a PRS signal to a terminal according to the PRS configuration information.

In one embodiment, the PRS configuration information includes the parameter information of PRS block sets;

where each PRS block set contains one or more PRS blocks, and each PRS block contains one or more consecutive OFDM symbols occupied by the PRS signal.

In one embodiment, the parameter information of PRS block sets includes: the time-domain configuration information and frequency-domain configuration information of transmitting PRS block set.

In one embodiment, the time-domain configuration information for transmitting PRS block set includes:

the period and the slot offset of a PRS block set;

PRS block identifiers or quantity of PRS blocks in a PRS block set;

positions and quantity of OFDM symbols occupied by a PRS in each PRS block, or positions and quantity of slots occupied for transmitting the PRS block;

the quantity of slots between every two adjacent PRS blocks, or the quantity of OFDM symbols between every two adjacent PRS blocks.

In one embodiment, the frequency-domain configuration information of transmitting PRS block set includes:

the PRS bandwidth, the frequency-domain position information, and the mapping information of a PRS RE in an RB.

In one embodiment, the resource mapping of a PRS in each PRS block set include one of the following:

in a first way: each PRS block set contains a quantity $N_{block}$ of PRS blocks, each PRS block contains a quantity $N_{symbol}$ of OFDM symbols occupied by PRS, each PRS block set contains a total quantity of $N_{set}=N_{block}*N_{symbol}$ of PRS OFDM symbols, the quantity $N_{set}$ of OFDM symbols occupied by PRS are sequentially mapped to slots for PRS occupied by the PRS block set in order of valid downlink OFDM symbols, and invalid OFDM symbols and TDD uplink OFDM symbols are avoided;

in a second way: each PRS block set contains a quantity $N_{block}$ of PRS blocks, each PRS block contains a quantity $N_{slot}$ of slots for PRS, there are a quantity $N_{gap}$ of slots between every two adjacent PRS blocks, $N_{gap} \geq 0$, and OFDM symbols occupied by PRS occupy all valid downlink OFDM symbols and avoid invalid OFDM symbols and TDD uplink OFDM symbols in each slot for PRS.

In one embodiment, the processor 500 is further configured to:

receive positioning measurements fed back by the terminal via a transceiver 510, the positioning measurements being obtained by the terminal by measuring the PRS signal, and position the terminal based on the positioning measurements.

The transceiver 510 is configured to receive and send the data under the control of the processor 500.

Here, in FIG. 6, the bus architecture can include any numbers of interconnected buses and bridges, and specifically link various circuits of one or more processors represented by the processor 500 and the memory represented by the memory 520. The bus architecture may further link various other circuits such as peripheral device, voltage regulator and power management circuit, which are all well known in the art and thus will not be further described again herein. The bus interface provides an interface. The transceiver 510 may be a plurality of elements, i.e., include a transmitter and a receiver, and provide the devices for communicating with various other devices over the transmission media. The processor 500 is responsible for managing the bus architecture and general processing, and the memory 520 may store the data used by the processor 500 when performing the operations.

The processor 500 may be Central Processing Device (CPU), Application Specific Integrated Circuit (ASIC), Field-Programmable Gate Array (FPGA) or Complex Programmable Logic Device (CPLD).

Figure 7:
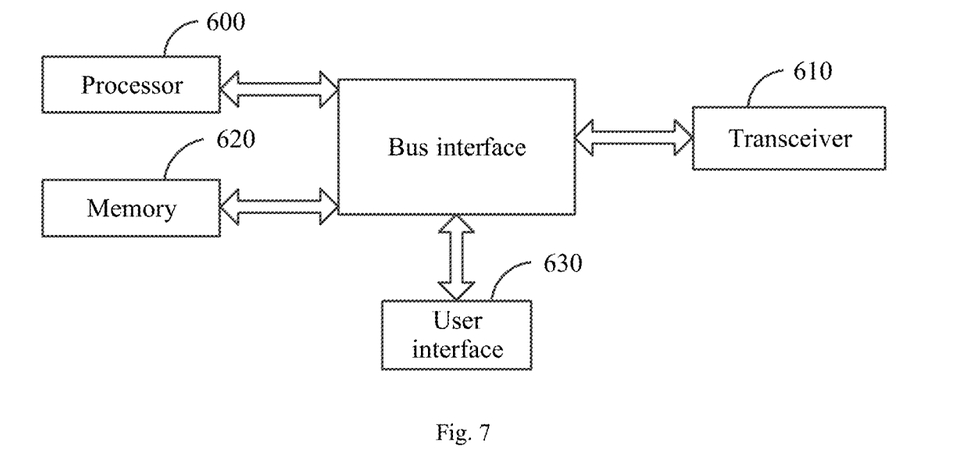
FIG. 7 is a structural schematic diagram of a signal transmission apparatus at the terminal side provided by some embodiments of the present application.

Referring to FIG. 7, at the terminal side, a signal transmission apparatus provided by some embodiments of the present application includes:

a memory 620 configured to store program instructions;

a processor 600 configured to invoke the program instructions stored in the memory, and in accordance with the obtained program, perform the process of:

determining the PRS configuration information preset for a cell;

receiving a PRS signal based on the PRS configuration information.

In one embodiment, the PRS configuration information includes the parameter information of PRS block sets;

where each PRS block set contains one or more PRS blocks, and each PRS block contains one or more consecutive OFDM symbols occupied by the PRS signal.

In one embodiment, the parameter information of PRS block sets includes: the time-domain configuration information and frequency-domain configuration information for transmitting PRS block sets.

In one embodiment, the time-domain configuration information for transmitting PRS block sets includes:

the period and the slot offset of a PRS block set;

PRS block identifiers or quantity of PRS blocks contained in a PRS block set;

positions and quantity of OFDM symbols occupied by a PRS in each PRS block, or positions and quantity of slots occupied for transmitting the PRS block;

the quantity of slots between every two adjacent PRS blocks, or the quantity of OFDM symbols between every two adjacent PRS blocks.

In one embodiment, the frequency-domain configuration information for transmitting PRS block set includes:

the PRS bandwidth, the frequency-domain position information, and the mapping information of a PRS RE in an RB.

In one embodiment, the resource mapping of a PRS in each PRS block set include one of the following:

in a first way: each PRS block set contains a quantity $N_{block}$ of PRS blocks, each PRS block contains a quantity $N_{symbol}$ of OFDM symbols occupied by PRS, each PRS block set contains a total quantity of $N_{set}=N_{block}*N_{symbol}$ of PRS OFDM symbols, the quantity $N_{set}$ of OFDM symbols occupied by PRS are sequentially mapped to slots for PRS occupied by the PRS block set in order of valid downlink OFDM symbols, and invalid OFDM symbols and TDD uplink OFDM symbols are avoided;

in a second way: each PRS block set contains a quantity $N_{block}$ of PRS blocks, each PRS block contains a quantity $N_{slot}$ of slots for PRS, there are a quantity $N_{gap}$ of slots between every two adjacent PRS blocks, $N_{gap} \geq 0$, and OFDM symbols occupied by PRS include all valid downlink OFDM symbols and avoid invalid OFDM symbols and TDD uplink OFDM symbols in each slot for PRS.

In one embodiment, the processor 600 is further configured to:

for any cell, detect each PRS block in a PRS block set transmitted in the cell;

determine a detectable PRS block in the PRS block set, determine positioning measurements by measuring a PRS signal in the detectable PRS block, and feedback the positioning measurements to a network side.

In one embodiment, the processor 600 is further configured to:

feedback the index information of the PRS block corresponding to the positioning measurements in the PRS block set.

In one embodiment, the processor 600 is further configured to:

feedback the measurement time corresponding to the positioning measurements.

The transceiver 610 is configured to receive and send the data under the control of the processor 600.

Here, in FIG. 7, the bus architecture may include any numbers of interconnected buses and bridges, and specifically link various circuits of one or more processors represented by the processor 600 and the memory represented by the memory 620. The bus architecture may further link various other circuits such as peripheral device, voltage regulator and power management circuit, which are all well known in the art and thus will not be further described again herein. The bus interface provides an interface. The transceiver 610 may be a plurality of elements, i.e., include a transmitter and a receiver, and provide the devices for communicating with various other devices over the transmission media. For different user equipments, the user interface 630 may also be the interface for inter-connecting or exter-connecting with the required devices, and the connected devices include but not limited to keypad, display, loudspeaker, microphone, joystick and the like.

The processor 600 is responsible for managing the bus architecture and general processing, and the memory 620 may store the data used by the processor 600 when performing the operations.

In one embodiment, the processor 600 can be Central Processing Device (CPU), Application Specific Integrated Circuit (ASIC), Field-Programmable Gate Array (FPGA) or Complex Programmable Logic Device (CPLD).

Figure 8:
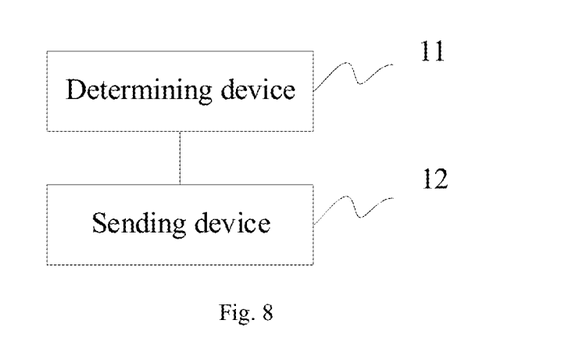
FIG. 8 is a structural schematic diagram of another signal transmission apparatus at the network side provided by some embodiments of the present application.

Referring to FIG. 8, at the network side, another signal transmission apparatus provided by some embodiments of the present application includes:

a determining device 11 configured to determine the PRS configuration information preset for a cell;

a sending device 12 configured to send a PRS signal to a terminal based on the PRS configuration information.

Figure 9:
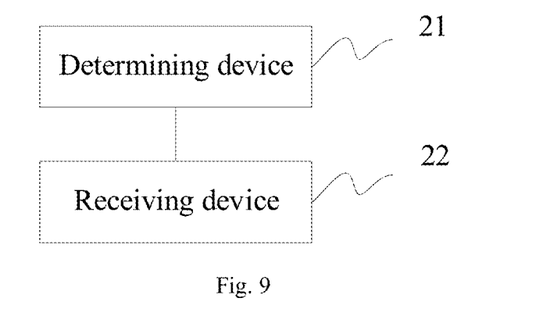
FIG. 9 is a structural schematic diagram of another signal transmission apparatus at the terminal side provided by some embodiments of the present application.

Referring to FIG. 9, at the terminal side, another signal transmission apparatus provided by some embodiments of the present application includes:

a determining device 21 configured to determine the PRS configuration information preset for a cell;

a receiving device 22 configured to receive a PRS signal based on the PRS configuration information.

Embodiments of the present application provide a computing device, which can specifically be a desktop computer, a portable computer, a smart phone, a tablet computer, a Personal Digital Assistant (PDA) or the like. The computing device can include a Center Processing Device (CPU), a memory, input/output devices and the like. The input device can include a keyboard, a mouse, a touch screen and the like, and the output device can include a display device such as Liquid Crystal Display (LCD), Cathode Ray Tube (CRT) or the like.

The memory can include a Read-Only Memory (ROM) and a Random Access Memory (RAM), and provide the program instructions and data stored in the memory to the processor. In an embodiment of the present application, the memory may be used to store the program of any one of the methods provided by the embodiments of the present application.

The processor invokes the program instructions stored in the memory and is configured to perform any one of the methods provided by the embodiments of the present application in accordance with the obtained program instructions.

Embodiments of the present application provide a computer storage medium for storing the computer program instructions used by the apparatuses provided by the embodiments of the present application described above, where the computer storage medium contains the program for performing any one of the methods provided by the embodiments of the present application described above.

The computer storage medium may be any available media or data storage device accessible to the computer, including but not limited to magnetic memory (e.g., floppy disk, hard disk, magnetic tape, Magnetic Optical disc (MO) or the like), optical memory (e.g., CD, DVD, BD, HVD or the like), semiconductor memory (e.g., ROM, EPROM, EEPROM, nonvolatile memory (NAND FLASH), Solid State Disk (SSD)) or the like.

The methods provided by the embodiments of the present application may be applied to the terminal devices, and may also be applied to the network devices.

Here, the terminal device can also referred to as the User Equipment ("UE" for short), Mobile Station ("MS" for short), Mobile Terminal ("MT" for short) or the like. In one embodiment, the terminal can has the ability of communicating with one or more core networks via the Radio Access Network (RAN). For example, the terminal can be a mobile telephone (or called "cellular" telephone), or a computer with the mobile property. For example, the terminal can also be a portable, pocket, handheld, computer built-in or vehicle-carried mobile device.

The network device may be a base station (e.g., access point), which means the device in the access network communicating with the wireless terminal via one or more sectors over the air interface. The base station may be used to perform the inter-conversion between the received air frame and the IP packet, and used as the router between the wireless terminal and the rest of the access network, and the rest of the access network may include Internet Protocol (IP) networks. The base station may further coordinate the attribute management of the air interface. For example, the base station can be the BTS in the GSM or CDMA, or can be the NodeB in the WCDMA, or can be the NodeB or eNB or e-NodeB (evolutional Node B) in the LTE, or can be the gNB in the 5G system, or the like. which is not limited in the embodiments of the present application.

The processing flows of the above methods may be implemented by a software program, which may be stored in a storage medium. When the stored software program is invoked, the above method steps are performed.

In view of the above, in the embodiments of the present application, the PRS block set, the PRS blocks, and the PRS mapping ways (first and second ways) in the PRS block set are configured. The terminal reports the block index information and/or reports the block set index information. The conventional LTE system does not support the multi-beam PRS transmission, and it cannot be applied to the 5G NR system for positioning. The positioning reference signal transmission method for multi-beam transmission proposed in embodiments of the application can be used for positioning in the 5G NR system.

The embodiments of the present application can provide methods, systems and computer program products. Thus the present application can take the form of hardware embodiments alone, software embodiments alone, or embodiments combining the software and hardware aspects. Also the present application can take the form of computer program products implemented on one or more computer usable storage mediums (including but not limited to magnetic disk memories, CD-ROMs, optical memories and the like) containing computer usable program codes therein.

The present application is described by reference to the flow charts and/or the block diagrams of the methods, the devices (systems) and the computer program products according to the embodiments of the present application. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which guides the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

What is claimed is:

1. A signal transmission method, comprising:
   determining, by a network side, Positioning Reference Signal, PRS, configuration information preset for a cell;
   sending, by the network side, a positioning reference signal to a terminal based on the PRS configuration information;
   wherein the PRS configuration information comprises parameter information of PRS block sets;
   wherein each PRS block set comprises one or more PRS blocks, and each PRS block comprises one or more consecutive Orthogonal Frequency Division Multiplexing, OFDM, symbols occupied by the positioning reference signal;
   wherein the parameter information of PRS block sets comprises: time-domain configuration information and frequency-domain configuration information for transmitting PRS block sets;
   wherein the time-domain configuration information of transmitting PRS block sets comprises:
   a period and a slot offset of a PRS block set; and/or
   positions and a quantity of OFDM symbols occupied by the positioning reference signal in each PRS block, or positions and a quantity of slots occupied for transmitting a PRS block.

2. The method according to claim 1, wherein the frequency-domain configuration information for transmitting PRS block sets comprises:
   a PRS bandwidth, frequency-domain position information, or mapping information of a PRS Resource Element, RE, in a Resource Block, RB.

3. The method according to claim 1, wherein resource mapping of the one or more OFMD symbols occupied by the positioning reference signal in each PRS block set is performed by one of following:
   a first way: each PRS block set contains a quantity $N_{block}$ of PRS blocks, each PRS block contains a quantity $N_{symbol}$ of OFDM symbols occupied by the positioning reference signal, each PRS block set contains a total quantity of $N_{set}=N_{block}*N_{symbol}$ of PRS OFDM symbols, the quantity $N_{set}$ of OFDM symbols occupied by the positioning reference signal are sequentially mapped to slots for PRS occupied by the PRS block set in order of valid downlink OFDM symbols, and invalid OFDM symbols and Time Division Duplexing, TDD, uplink OFDM symbols are avoided;
   a second way: each PRS block set contains a quantity $N_{block}$ of PRS blocks, each PRS block contains a quantity $N_{slot}$ of slots for PRS, there are a quantity $N_{gap}$ of slots between every two adjacent PRS blocks, $N_{gap} \geq 0$, and OFDM symbols occupied by the PRS comprise all valid downlink OFDM symbols and avoid invalid OFDM symbols and TDD uplink OFDM symbols in each slot for PRS.

4. The method according to claim 1, wherein the method further comprises:
   receiving positioning measurements fed back by the terminal, the positioning measurements being obtained by the terminal by measuring the positioning reference signal and sent by a network side; and
   positioning, by the terminal, the terminal based on the positioning measurements.

5. A signal transmission method, comprising:
   determining, by a terminal, Positioning Reference Signal, PRS, configuration information preset for a cell and sent by a network side;
   receiving, by the terminal, a positioning reference signal based on the PRS configuration information;
   wherein the PRS configuration information comprises parameter information of PRS block sets;
   wherein each PRS block set comprises one or more PRS blocks, and each PRS block comprises one or more consecutive Orthogonal Frequency Division Multiplexing, OFDM, symbols occupied by the positioning reference signal;
   wherein the parameter information of PRS block sets comprises: time-domain configuration information and frequency-domain configuration information for transmitting PRS block sets;
   wherein the time-domain configuration information for transmitting PRS block sets comprises:
   a period and a slot offset of a PRS block set; and/or
   positions and a quantity of OFDM symbols occupied by a positioning reference signal in each PRS block, or positions and a quantity of slots occupied for transmitting a PRS block.

6. The method according to claim 5, wherein the frequency-domain configuration information for transmitting PRS block sets comprises:
   a PRS bandwidth, frequency-domain position information, or mapping information of a PRS Resource Element, RE, in a Resource Block, RB.

7. The method according to claim 5, wherein resource mapping of the one or more OFMD symbols occupied by the positioning reference signal in each PRS block set is performed by one of following:
   a first way: each PRS block set contains a quantity $N_{block}$ of PRS blocks, each PRS block contains a quantity $N_{symbol}$ of OFDM symbols occupied by the positioning reference signal, each PRS block set contains a total quantity of $N_{set}=N_{block}*N_{symbol}$ of PRS OFDM symbols, the quantity $N_{set}$ of OFDM symbols occupied by the positioning reference signal are sequentially mapped to slots for PRS occupied by the PRS block set in order of valid downlink OFDM symbols, and invalid OFDM symbols and Time Division Duplexing, TDD, uplink OFDM symbols are avoided;
   a second way: each PRS block set contains a quantity $N_{block}$ of PRS blocks, each PRS block contains a quantity $N_{slot}$ of slots for PRS, there are a quantity $N_{gap}$ of slots between every two adjacent PRS blocks, $N_{gap} \geq 0$, and OFDM symbols occupied by the positioning reference signal comprises all valid downlink OFDM symbols and avoid invalid OFDM symbols and TDD uplink OFDM symbols in each slot for PRS.

8. The method according to claim 5, wherein the method further comprises:
   for any cell, detecting each PRS block in a PRS block set transmitted in the cell;
   determining a detectable PRS block in the PRS block set;
   determining positioning measurements by measuring a positioning reference signal in the detectable PRS block; and feeding back the positioning measurements to a network side.

9. The method according to claim 8, wherein the method further comprises:
feeding back index information of the PRS block corresponding to the positioning measurements in the PRS block set.

10. The method according to claim 8, wherein the method further comprises:
feeding back measurement time corresponding to the positioning measurements.

11. A signal transmission apparatus, comprising:
a memory for storing program instructions;
a processor for invoking the program instructions stored in the memory, and in accordance with obtained program, performing a process of:
determining Positioning Reference Signal, PRS, configuration information preset for a cell;
sending a positioning reference signal to a terminal based on the PRS configuration information;
wherein the PRS configuration information comprises parameter information of PRS block sets;
wherein each PRS block set comprises one or more PRS blocks, and each PRS block comprises one or more consecutive Orthogonal Frequency Division Multiplexing, OFDM, symbols occupied by the positioning reference signal;
wherein the parameter information of PRS block sets comprises: time-domain configuration information and frequency-domain configuration information for transmitting PRS block sets;
wherein the time-domain configuration information of transmitting PRS block sets comprises:
a period and a slot offset of a PRS block set; and/or
positions and a quantity of OFDM symbols occupied by the positioning reference signal in each PRS block, or positions and a quantity of slots occupied for transmitting a PRS block.

12. The apparatus according to claim 11, wherein the frequency-domain configuration information for transmitting PRS block sets comprises:
a PRS bandwidth, frequency-domain position information, or mapping information of a PRS Resource Element, RE, in a Resource Block, RB.

13. The apparatus according to claim 11, wherein resource mapping of the one or more OFMD symbols occupied by the positioning reference signal in each PRS block set is performed by one of following:
a first way: each PRS block set contains a quantity $N_{block}$ of PRS blocks, each PRS block contains a quantity $N_{symbol}$ of OFDM symbols occupied by the positioning reference signal, each PRS block set contains a total quantity of $N_{set}=N_{block}*N_{symbol}$ of PRS OFDM symbols, the quantity $N_{set}$ of OFDM symbols occupied by the positioning reference signal are sequentially mapped to slots for PRS occupied by the PRS block set in order of valid downlink OFDM symbols, and invalid OFDM symbols and Time Division Duplexing, TDD, uplink OFDM symbols are avoided;
a second way: each PRS block set contains a quantity $N_{block}$ of PRS blocks, each PRS block contains a quantity $N_{slot}$ of slots for PRS, there are a quantity $N_{gap}$ of slots between every two adjacent PRS blocks, $N_{gap} \geq 0$, and OFDM symbols occupied by the positioning reference signal comprise all valid downlink OFDM symbols and avoid invalid OFDM symbols and TDD uplink OFDM symbols in each slot for PRS.

14. A signal transmission apparatus, comprising:
a memory for storing program instructions;
a processor for invoking the program instructions stored in the memory, and in accordance with obtained program, performing a process of:
determining Positioning Reference Signal, PRS, configuration information preset for a cell and sent by a network side;
receiving a positioning reference signal based on the PRS configuration information;
wherein the PRS configuration information comprises parameter information of PRS block sets;
wherein each PRS block set comprises one or more PRS blocks, and each PRS block comprises one or more consecutive Orthogonal Frequency Division Multiplexing, OFDM, symbols occupied by the positioning reference signal;
wherein the parameter information of PRS block sets comprises: time-domain configuration information and frequency-domain configuration information for transmitting PRS block sets;
wherein the time-domain configuration information for transmitting PRS block sets comprises:
a period and a slot offset of a PRS block set; and/or
positions and a quantity of OFDM symbols occupied by a positioning reference signal in each PRS block, or positions and a quantity of slots occupied for transmitting a PRS block.

15. The signal transmission apparatus according to claim 14, wherein the frequency-domain configuration information for transmitting PRS block sets comprises:
a PRS bandwidth, frequency-domain position information, or mapping information of a PRS Resource Element, RE, in a Resource Block, RB.

16. The signal transmission apparatus according to claim 14, wherein resource mapping of the one or more OFMD symbols occupied by the positioning reference signal in each PRS block set is performed by one of following:
a first way: each PRS block set contains a quantity $N_{block}$ of PRS blocks, each PRS block contains a quantity $N_{symbol}$ of OFDM symbols occupied by the positioning reference signal, each PRS block set contains a total quantity of $N_{set}=N_{block}*N_{symbol}$ of PRS OFDM symbols, the quantity $N_{set}$ of OFDM symbols occupied by the positioning reference signal are sequentially mapped to slots for PRS occupied by the PRS block set in order of valid downlink OFDM symbols, and invalid OFDM symbols and Time Division Duplexing, TDD, uplink OFDM symbols are avoided;
a second way: each PRS block set contains a quantity $N_{block}$ of PRS blocks, each PRS block contains a quantity $N_{slot}$ of slots for PRS, there are a quantity $N_{gap}$ of slots between every two adjacent PRS blocks, $N_{gap} \geq 0$, and OFDM symbols occupied by the positioning reference signal comprises all valid downlink OFDM symbols and avoid invalid OFDM symbols and TDD uplink OFDM symbols in each slot for PRS.

17. The signal transmission apparatus according to claim 14, wherein the processor for invoking the program instructions stored in the memory, and in accordance with obtained program, further performs:
for any cell, detecting each PRS block in a PRS block set transmitted in the cell;
determining a detectable PRS block in the PRS block set;
determining positioning measurements by measuring a positioning reference signal in the detectable PRS block; and feeding back the positioning measurements to a network side.

18. The signal transmission apparatus according to claim 17, wherein the processor for invoking the program instructions stored in the memory, and in accordance with obtained program, further performs:

feeding back index information of the PRS block corresponding to the positioning measurements in the PRS block set.

19. The method according to claim 17, wherein the processor for invoking the program instructions stored in the memory, and in accordance with obtained program, further performs:

feeding back measurement time corresponding to the positioning measurements.

* * * * *